US008137728B2

(12) United States Patent
McClements et al.

(10) Patent No.: US 8,137,728 B2
(45) Date of Patent: Mar. 20, 2012

(54) BIOPOLYMER ENCAPSULATION AND STABILIZATION OF LIPID SYSTEMS AND METHODS FOR UTILIZATION THEREOF

(75) Inventors: David Julian McClements, Northampton, MA (US); Eric Andrew Decker, Sunderland, MA (US)

(73) Assignee: University of Massachusetts, Boston, MA (US)

( * ) Notice: Subject to any disclaimer, the term of this patent is extended or adjusted under 35 U.S.C. 154(b) by 769 days.

(21) Appl. No.: 11/078,216

(22) Filed: Mar. 11, 2005

(65) Prior Publication Data

US 2005/0202149 A1    Sep. 15, 2005

Related U.S. Application Data

(60) Provisional application No. 60/552,165, filed on Mar. 11, 2004.

(51) Int. Cl.
*A23D 9/00* (2006.01)
(52) U.S. Cl. .......................... 426/602; 426/601; 264/4.32
(58) Field of Classification Search .......... 426/601–613; 264/4.32
See application file for complete search history.

(56) References Cited

U.S. PATENT DOCUMENTS

| | | | | |
|---|---|---|---|---|
| 4,632,840 | A * | 12/1986 | Takahashi et al. | 426/602 |
| 4,714,566 | A * | 12/1987 | Takahashi et al. | 516/54 |
| 5,208,111 | A | 5/1993 | Decher et al. | |
| 5,543,162 | A * | 8/1996 | Timonen et al. | 426/89 |
| 5,672,301 | A * | 9/1997 | Orly et al. | 264/4.1 |
| 6,479,146 | B1 | 11/2002 | Caruso et al. | |
| 6,488,870 | B1 * | 12/2002 | Chopra et al. | 264/4.1 |
| 6,492,096 | B1 | 12/2002 | Liu et al. | |
| 6,699,501 | B1 | 3/2004 | Neu et al. | |
| 6,710,111 | B2 | 3/2004 | Kuo et al. | |
| 6,723,358 | B1 * | 4/2004 | van Lengerich | 426/94 |
| 2002/0119238 | A1* | 8/2002 | Pires | 426/602 |
| 2003/0054082 | A1* | 3/2003 | Koike et al. | 426/601 |
| 2004/0013721 | A1 | 1/2004 | Antipov et al. | |
| 2004/0013738 | A1* | 1/2004 | Voigt et al. | 424/490 |
| 2007/0166437 | A1* | 7/2007 | Bevers et al. | 426/132 |

FOREIGN PATENT DOCUMENTS

EP    1 252 222    9/2005

OTHER PUBLICATIONS

Einhorn-Stoll, U. 1998. Nahrung 42(1998)Nr. 3/4, p. 248-249.*
Charley, H. 1970. Food Science. The Ronald Press Company, New York. p. 248.*
Hyun Jung Kim, Seung Jun Choi, Weon-Sun Shin, Tae Wha Moon; Emulsifying Properties by Bovine Serum Albumin-Galactomannan Conjugates; J. Agric. Food Chem. 2003, 51, 1049-1056.
Harnsilawat T, Pongsawatmanit R and McClements D; Stabilization of Model Beverage Cloud Emulsions Using Protein-Polysaccharide Electrostatic Complexes Formed at the Oil-Water Interface; J. Agric. Food Chem., 2006, 5540-5547, 54 (15).
Decher G; Fuzzy Nanoassemblies: Toward Layered Polymeric Multicomposites; Science, Aug. 29, 1997, 1232-1237, vol. 277; www.sciencemag.org.
Ogawa, S; Decker, E; and McClements, DJ; Production and Characterization of O/W Emulsions Containing Callonic Droplets Stabilized by Lecithin-Chitosan Membranes; J. Agric. Food Chem. 2003, 2806-2812, 51.
Ogawa, S; Decker, E; and McClements, DJ; Influence of Environmental Conditions on the Stability of Oil in Water Emulsions Containing Droplets Stabilized by Lecithin-Chitosan Membranes; J. Agric. Food Chem. 2003, 5522-5527, 51.
Moreau, L; Kim, H-J; Decker, E; and McClements, DJ; Production and Characterization of Oil-in-Water Emulsions Containing Droplets Stabilized by β-Lactoglobulin-Pectin Membranes; J. Agric. Food Chem. 2003, 6612-6617, 51.
Ogawa, S; Decker, E; and McClements, DJ; Production and Characterization of O/W Emulsions Containing Droplets Stabilized by Lecithin-Chitosan-Pectin Multilayered Membranes; J. Agric. Food Chem. 2004, 3595-3600, 52.
Klinkesorn, U; Sophanodora, P; Chinachoti, P; Decker, E; and McClements, DJ; Encapsulation of emulsified tuna oil in two-layered interfacial membranes prepared using electrostatic layer-by-layer deposition; Food Hydrocolloids, 2005, 1044-1053, 19.
Kim HJ; Choi, SJ; Shin, W-S; and Moon, TW; Emulsifying Properties of Bovine Serum Albumin-Galactomannan Conjugates; J. Agric. Food Chem. 2003, 1049-1056, 51.
Mun, S; Decker, E; Park, Y; Weiss, J; McClements, DJ; Influence of Interfacial Composition on in Vitro Digestibility of Emulsified Lipids: Potential Mechanism for Chitosan's Ability to Inhibit Fat Digestion; FOBI, (forthcoming, 2006), Danish Biotech Research Academy/Springer Science+Business Media, Inc.
Benichou, A; Aserin, A; and Garti, N; Protein-Polysaccharide Interactions for Stabilization of Food Emulsions; J. Dispersion Science and Technology, 2002, 93-123, 23 (1-3).

* cited by examiner

*Primary Examiner* — Carolyn Paden
(74) *Attorney, Agent, or Firm* — Reinhart Boerner Van Deuren s.c.

(57) ABSTRACT

An emulsion system and method for controlling the digestion of a fat or an oil component is provided including a substantially hydrophobic food-grade component, and at least one of an emulsifier component, and one or more of polymeric components, wherein at least one of the emulsifier component and the polymeric component comprises a substantially indigestible food-grade material, such as an indigestible dietary fiber. The emulsifier component and/or the polymeric component can be selected so that the overall interfacial membrane is indigestible to humans and/or animals.

21 Claims, 9 Drawing Sheets

BIOPOLYMER ENCAPSULATION AND STABILIZATION OF LIPID SYSTEMS AND METHODS FOR UTILIZATION THEREOF

This application claims priority benefit from application Ser. No. 60/552,165 filed Mar. 11, 2004, the entirety of which is incorporated herein by reference.

The United States Government has certain rights to this invention pursuant to Grant No. 2002-35503-12296 from the NRI Competitive Grants Program and the CREES, IFAFS Program of the United States Department of Agriculture.

FIELD OF THE INVENTION

This invention relates to encapsulated lipid components provided within environmentally stable emulsion systems having interfacial membranes impermeable to degradation during digestion and methods for providing reduced fat and/or reduced caloric food products produced therefrom.

BACKGROUND OF THE INVENTION

It is well established that over-consumption of fats and oils leads to a variety of human health problems, including obesity, cardiovascular disease, hypertension and cancer. For example, the prevalence of obesity in the United States has increased by over 30% during the past decade. These diseases cause a major deterioration in the quality of life of the individuals involved, as well as putting a large economic burden on society as a whole. Consequently, there has been a major drive to educate people about the health risks associated with over-consumption of fats and oils, with the aim of reducing the proportion of calories obtained from fat. The food industry has responded to this major health problem by developing and promoting reduced fat, low-fat or fat-free versions of many fatty food products. The manufacture of fat-reduced products is now a major sector of the food industry.

Nevertheless, many consumers do not incorporate fat-reduced products into their diets because of the undesirable quality attributes often associated with this kind of product. A wide variety of different technologies have previously been developed: including fat substitutes (e.g., Olestra™), low-calorie fats (e.g., Salatrim™, Caprenin™), fat mimetics (e.g., maltodextrin, biopolymers, Simplesse™) and fat extenders. Each of these technologies has its own advantages and disadvantages, and an effective fat replacement strategy usually involves combining a number of fat replacers with different functional properties to achieve a final product with desirable quality attributes.

There is therefore an urgent need to develop fat-reduced products that have quality attributes that are more desirable to consumers. Not only there is a need for incorporation of edible oils into reduced fat and/or reduced calorie food products that retain the taste, texture, appearance and shelf-life in the food product—the oils must be provided in a manner capable of withstanding the environmental conditions that inherently promote instability of oil-in-water emulsions, such as elevated temperatures, freeze-thaw cycling, high mineral contents and mechanical agitation.

Further, over consumption of lipids is also a major problem for many domesticated animals, such as cats and dogs, so there is a drive to identify technologies that can also be used for pet foods.

SUMMARY OF THE INVENTION

Figure 1:
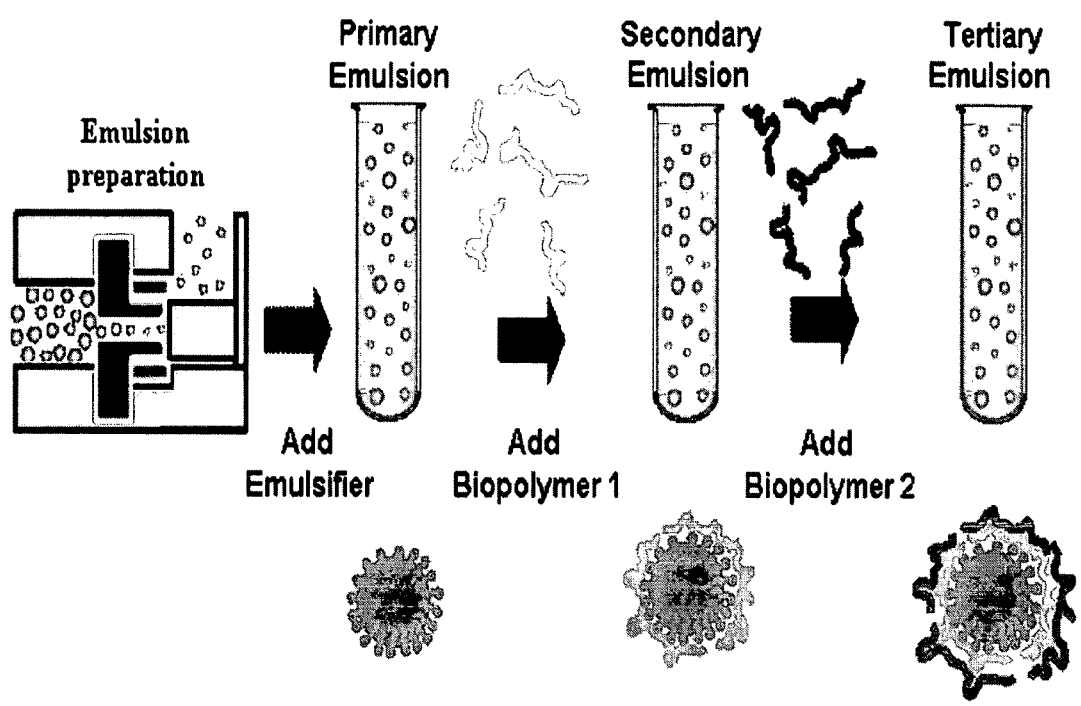
FIG. 1. Schematic representation of production of oil-in-water emulsions, in accordance with this invention, comprising hydrophobic droplets stabilized by one or more layers (e.g., 3 layers: emulsifier-biopolymer 1-biopolymer 2), with one or more such layer or polymeric components comprising a dietary fiber compound or composition.

In light of the foregoing, it is an object of the present invention to provide a wide range of lipid components encapsulated within at least one impermeable and/or indigestible membrane and methods for their production and use in reduced calorie and/or reduced fat food products, thereby overcoming various deficiencies and shortcomings of the prior art, including those discussed above.

It is an object of the present invention to provide encapsulated lipid components having the physicochemical and sensory properties of the lipid template thereby permitting incorporation of such encapsulated lipids into reduced calorie and/or reduced fat food products while maintaining the texture, taste, stability and appearance of full fat or full calorie foods.

It is a related object of the present invention to encapsulate oils, fats and/or lipids in either single-layered or multi-layered interfacial membrane(s) comprising, optionally, at least one indigestible polymeric/fiber component to control the digestion and/or absorption of the lipid component into the digestive system of either a human or an animal.

It is another object of the present invention to provide a variety of stabilized emulsion systems including such encapsulated lipid components, wherein the emulsion systems are environmentally stable against elevated temperatures, freeze-thaw cycling, high mineral contents, mechanical agitation and/or the environmental conditions required by the reduced calorie/reduce fat food product.

It is another object of the present invention to provide a method for specific design of emulsion systems including preparation of an indigestible lipid component and selection of at least one emulsifier component, depending on the processing and end-use requirements of the food product, and including incorporation of the emulsion system into a wide variety food products and/or beverages.

It is yet another object of the present invention to provide a process for lipid fortification of foods, beverages or pharmaceutical products to enhance the taste, texture, appearance and/or shelf-life of the products, without the addition of digestible fat, calories or cholesterol to the products, whereby the insoluble fiber content of the product is also enhanced.

Accordingly, it is an object of the present invention to provide various encapsulated lipid components, stabilized emulsion systems and reduced fat/calorie food and/or beverage products produced therefrom, thereby overcoming various deficiencies and shortcomings of the prior art, including those outlined above. It will be understood by those skilled in the art that one or more aspects of this invention can meet certain objectives, while one or more other aspects can lead to certain other objectives. Each objective may not apply equally, in all instances, to every aspect of the present invention. As such, these and other objects can be viewed in the alternative with respect to any one aspect of the present invention.

Other objects, features, benefits and advantages of the present invention will be apparent in this summary and descriptions of preferred embodiments, and will be readily apparent to those skilled in the art having the knowledge and experience in the area of food science and engineering. Such objects, features, benefits and advantages will be apparent from the above as taken in conjunction with the accompanying examples, data and all reasonable inferences to be drawn therefrom.

For the purposes of the present compositions and/or methods, the term "indigestible" will be understood to mean components that are substantially resistant to digestive degradation, absorption and/or uptake into the digestive tract under conditions substantially commensurate with those described herein.

In addition, the terms "dietary fiber" and "indigestible fiber" will be understood to mean emulsifier components and polymeric components which preclude or are resistant to digestive degradation under conditions substantially commensurate with those described herein.

Accordingly, the present invention relates, in part, to a composition comprising a substantially hydrophobic component, and at least one of an emulsifier component, and one or more of polymeric components, wherein at least one of the emulsifier component and the polymeric component comprises a substantially indigestible food-grade material. In particular, the emulsifier component and/or the polymeric component will be selected so that the overall interfacial membrane is indigestible to humans and/or animals. In certain embodiments, the emulsifier and/or one or more of the polymeric components can comprise an indigestible dietary fiber, optionally impermeable with respect to the hydrophobic component. Consistent with the broader aspects of the present invention, such a composition can comprise a plurality of interfacial layers of any food-grade material, each layer possessing a net charge opposite that of at least a portion of an adjacent such material.

The hydrophobic component can be at least partially insoluble in an aqueous medium and/or is capable of forming emulsions in an aqueous medium. Preferably, the hydrophobic component comprises a fat or an oil component, including but not limited to, any edible food oil known to those skilled in the art (e.g., corn, soybean, canola, rapeseed, olive, peanut, algal, nut and/or vegetable oils, fish oils or a combination thereof). The hydrophobic component may be selected hydrogenated or partially hydrogenated fats and/or oils, and can include any dairy or animal fat or oil including, for example, dairy fats. In addition, the hydrophobic component may further comprise components such as flavors, preservatives and/or nutritional components, such as fat soluble vitamins, at least partially miscible therewith.

It will be readily apparent that, consistent with the broader aspects of the invention, the hydrophobic component can further include any natural and/or synthetic lipid components including, but not limited to, fatty acids (saturated or unsaturated), glycerols, glycerides and their respective derivatives, phospholipids and their respective derivatives, glycolipids, phytosterol and/or sterol esters (e.g. cholesterol esters, phytosterol esters and derivatives thereof), carotenoids, terpenes, antioxidants, colorants, and/or flavor oils (for example, peppermint, citrus, coconut, or vanilla), as may be required by a given food or beverage end use application. The present invention, therefore, contemplates a wide range of oil/fat and/or lipid components of varying molecular weight and comprising a range of hydrocarbon (aromatic, saturated or unsaturated), alcohol, aldehyde, ketone, acid and/or amine moieties or functional groups.

The emulsifier component can comprise any food-grade surface active ingredient, cationic surfactant, anionic surfactant and/or non-ionic surfactant known to those skilled in the art capable of at least partly emulsifying the hydrophobic component in an aqueous phase. The emulsifier component can include small-molecule surfactants, phospholipids, proteins and polysaccharides. Such emulsifiers can further include, but are not limited to, lecithin, chitosan, pectin, gums (e.g. locust bean gum, gum arabic, guar gum, etc.), alginic acids, alginates and derivatives thereof, and cellulose and derivatives thereof. Protein emulsifiers can include any one of the dairy proteins, vegetable proteins, meat proteins, fish proteins, plant proteins, ovalbumins, glycoproteins, mucoproteins, phosphoproteins, serum albumins, collagen and combinations thereof. Protein emulsifying components can be selected on the basis of their amino acid residues (e.g., lysine, arginine, asparatic acid, glutamic acid, etc.) to optimize the overall net charge of the interfacial membrane about the hydrophobic component, and therefore the stability of the hydrophobic component within the resultant emulsion system.

Indeed, the emulsifier component can include a broad spectrum of emulsifiers including, for example, acetic acid esters of monogylcerides (ACTEM), lactic acid esters of monogylcerides (LACTEM), citric acid esters of monogylcerides (CITREM), diacetyl acid esters of monogylcerides (DATEM), succinic acid esters of monogylcerides, polyglycerol polyricinoleate, sorbitan esters of fatty acids, propylene glycol esters of fatty acids, sucrose esters of fatty acids, mono and diglycerides, fruit acid esters, stearoyl lactylates, polysorbates, starches, sodium dodecyl sulfate (SDS) and/or combinations thereof.

Preferably, emulsifier selection can be made based on the ability of the emulsifier to form an interfacial membrane that is at least partly indigestible by human or animal digestive systems and provides emulsion stability under required environmental and/or processing conditions pertaining to a specific food product. In addition, the emulsifier component may be selected to minimize droplet size during homogenization. Optionally, emulsifier selection may be influenced by cost, ease of utilization, processing requirements, compatibility with other ingredients, environmental sensitivity and reliability of supply.

As discussed above, a polymeric component can comprise any food-grade polymeric material capable of adsorption, interaction and/or linkage to the hydrophobic component droplets and/or an adjacent underlying layer. Accordingly, the food-grade polymeric component can be a biopolymer material selected from, but not limited to, proteins, ionic or ionizable polysaccharides such as chitosan and/or chitosan sulfate, cellulose, pectins, alginates, nucleic acids, glycogen, amylose, chitin, polynucleotides, gum arabic, gum acacia, carageenan, xanthan, agar, gellan gum, tragacanth gum, karaya gum, locust bean gum, lignin and/or combinations thereof. The food-grade polymeric component may alternatively be selected from modified polymers such as modified starch, carboxymethyl cellulose, carboxymethyl dextran or lignin sulfonates.

In certain embodiments, at least one of the emulsifier component and the food-grade polymeric component used to encapsulate the hydrophobic component comprises a surface-active inedible/indigestible food-grade component or ingredient, wherein the indigestible component is capable of forming an interfacial membrane surrounding the hydrophobic component, substantially unaffected by solution conditions and digestive enzymes in the body, thereby preventing absorption, uptake and/or release into the digestive tract. Preferably, the indigestible food-grade component is an indigestible fiber component. Such components can include, but are not limited to, any soluble, partly soluble, insoluble, viscous and/or fermentable dietary fiber known to those skilled in the art. Dietary fiber components include, but are not limited to, polysaccharides such as chitosan, cellulose and derivatives thereof, methyl cellulose, inulin and derivatives thereof, lignin, aminopolysaccharides, gums and/or combinations thereof. The emulsifier component and/or the food-grade polymeric component can further include any surface-active, indigestible food-grade dietary fiber known to those skilled in the art.

Optionally, the hydrophobic component can be stabilized by a single layer/membrane comprising a covalent protein-polysaccharide complex. For example, at least one of the emulsifier and polymeric components can comprise a Maillard reaction product of a protein and a polysaccharide. See, e.g., Benichow, et al., Protein-polysaccharide Interactions for Stabilization of Food Emulsions. J. Disp. Sci. Tech. 2002, 23, 93; and Moon, et al., Emulsifying Properties of Bovine Serum Albumin-Galactomannan Conjugates. J. Agric. Food Chem. 2003, 51, 1049. Where the protein is surface-active and the polysaccharide is an indigestible dietary fiber, a composition of this invention can comprise such a conjugate as a single interfacial membrane component affording benefits and advantages of the type discussed elsewhere herein. Thus, consistent with the broader aspects of the present invention, the compositions can comprise a single layer of any covalent alteration of a dietary fiber and/or indigestible food-grade component capable of adsorbing to the hydrophobic component-aqueous interface and/or at least partially dispersing the hydrophobic component in the aqueous medium, including but not limited to lipid-polysaccharide complexes.

The present invention contemplates any combination and numbers of interfacial layers leading to the formation of an interfacial system comprising an oil/fat and/or lipid indigestible to human and certain animal digestive systems, and stable under environmental or end-use conditions applicable to a specific food product. Accordingly, the hydrophobic component may be encapsulated with and/or immobilized by a wide variety of emulsifier/polymeric components, depending on the pH, ionic strength, salt concentration, temperature and processing requirements of the emulsion system/food product into which the hydrophobic component is incorporated. There is no limitation as to the emulsifier/polymeric component utilized in the present invention provided such a component can form a substantially stable emulsion system and/or have the ability to form a substantially stable complex with another component electrostatically or via other interactions such as hydrophobic interactions, hydrogen bonding and/or dipole-dipole interactions, and—in certain embodiments—provides an indigestible interfacial membrane. For example, larger (or smaller) multilayer compositions may be obtained by incorporating a desired number of interfacial layers of oppositely emulsifier/polymeric components depending on a given end-use application.

As a result, the compositions of this invention can comprise single- or multi-interfacial components, regardless of digestibility or permeability, depending upon a particular food product and/or end-use application. For instance, a particular food product or application may encompass both caloric and flavor considerations. The present invention can address both concerns with a digestible fat/oil component encapsulated with one or more substantially impermeable interfacial components comprising an indigestible dietary fiber, as well as a hydrophobic flavor component stabilized by one or more such interfacial components but having a degree of permeability sufficient to impart desired flavor to the food product or application. Such considerations can be addressed using the same or comparable emulsifier and/or polymeric components with varying degrees of permeability or, alternatively, by incorporation of different emulsion systems within the same product or application.

Accordingly, in part, the present invention can also be directed to an emulsion system comprising at least one single- or multi-layered composition at least partly dispersed in an aqueous medium. Without limitation, in addition to those embodiments discussed above, a multilayer composition can comprise a hydrophobic component emulsified by an emulsifier component having a net charge, and one or more food-grade polymeric components and/or food-grade materials having an overall net charge opposite at least a portion of the emulsifier component or opposite at least a portion of an adjacent polymeric component. The emulsion system may include any hydrophobic component (e.g., fat, oil and/or lipid), emulsifier and/or polymeric component described herein, regardless of the aqueous medium. Accordingly, the present invention can be used in conjunction with a range of emulsion-type food products of the sort otherwise described herein, such products including but not limited to, salad dressings, yogurts, sauces, soups, dips, creams, dairy or soy beverages, gravies, pet foods and the like.

Thus, in part, the present invention includes a method of producing substantially indigestible multilayer compositions including providing a hydrophobic component and emulsifying the hydrophobic component with an emulsifier component, wherein at least a portion of the emulsifier component has a net charge. The method can further include incorporating a plurality of layers of food-grade polymeric components, at least a portion of which comprises a net charge opposite that of the emulsifier component and/or the previously applied food-grade polymeric component. Accordingly, in certain embodiments, assembly of a multilayered composition can be performed by alternating contact or adsorption of oppositely charged emulsifier and/or food-grade polymeric components onto the surface of the composition with each layer in electrostatic interaction with the underlying subsequently adsorbed or contacted layer. The method can optionally include mechanical agitation and/or sonication of the multilayer composition to disrupt any aggregation or flocs formed.

The hydrophobic component, includes those described herein and may be charged or uncharged. The emulsifier component and/or the food-grade polymeric component utilized in subsequent layers may be any one or more of the materials described herein, wherein each layer may comprise one or more emulsifier and/or food-grade polymeric components or mixtures of components providing the desired net charge effect and/or capable of interaction with the hydrophobic component, a subsequently contacted layer or both.

Without limitation, emulsions stabilized by multi-component interfacial membranes containing dietary fiber can be produced by one of three methods: (1) incorporating emulsifiers and/or polymeric components into the system before homogenization of the oil and aqueous phase; (2) incorporating emulsifiers and/or polymeric components into the system after homogenization of the oil and aqueous phase; and (3) incorporating emulsifiers and/or polymeric components into the system during homogenization of the oil and aqueous phase.

In the second case, a multiple-stage process could be used to produce the emulsions (see FIG. 1). For example, the following procedure could be used to form an emulsion coated by three layers (e.g., emulsifier-biopolymer 1-biopolymer 2). First, a primary emulsion comprising electrically charged droplets stabilized by a layer of emulsifier can be prepared by homogenizing oil, aqueous phase and an ionic emulsifier together. If necessary, mechanical agitation or sonication can be applied to the primary emulsion to disrupt any flocs formed, and emulsion washing could be carried out to remove any non-adsorbed biopolymer (e.g., by centrifugation or filtration). Second, a secondary emulsion comprising charged droplets stabilized by emulsifier-biopolymer 1 membranes can be formed by incorporating biopolymer 1 into the primary emulsion. Biopolymer 1 can have an opposite electrical charge than the net charge of at least a portion of the droplets in the primary emulsion. If necessary, mechanical agitation or sonication can be applied to the secondary emulsion to disrupt any flocs formed, and washing could be used to remove any non-adsorbed biopolymer (e.g., by centrifugation or filtration). Third, tertiary emulsions comprising droplets stabilized by emulsifier-biopolymer 1-biopolymer 2 interfacial membranes can be formed by incorporating biopolymer 2 into the secondary emulsion. Biopolymer 2 can have an opposite electrical charge than the net charge of at least a portion of the droplets in the secondary emulsion. If necessary, mechanical agitation or sonication can be applied to the tertiary emulsion to disrupt any flocs formed, and emulsion washing could be carried out to remove any non-adsorbed biopolymer (e.g., by centrifugation or filtration). This procedure can be continued to add more layers to the interfacial membrane. At least one of the layers comprises a substantially indigestible dietary fiber and/or the overall multilayer membrane surrounding the droplets is substantially indigestible.

For example, with reference to the following examples, emulsions containing tri-layer coated lipid droplets were prepared using a method that utilizes food-grade ingredients (lecithin, chitosan, pectin) and standard preparation procedures (homogenization, mixing). Initially, a primary emulsion containing small anionic capsules was produced by homogenization of oil, water and lecithin. A secondary emulsion containing cationic capsules coated with a lecithin-chitosan membrane was then produced by mixing a chitosan solution with the primary emulsion, and applying mechanical agitation to disrupt any flocs formed. A tertiary emulsion containing anionic capsules coated with a lecithin-chitosan-pectin membrane was then produced by mixing a pectin solution with the secondary emulsion, and again applying mechanical agitation to disrupt any flocs formed. The capsules in the tertiary emulsions had good stability to aggregation and creaming over a wide range of pH values (pH 4-8 at 0 mM NaCl, and pH 3-8 at 100 mM NaCl).

Further, with reference to Example 6A and 6B, emulsion compositions comprising oil droplets stabilized by SDS-chitosan-pectin membranes remain intact during digestion even after the bile (pH 5.3) was added to the system. Extensive aggregation was observed by optical microscopy when the pH was adjusted to pH 7.5 and the oil droplets were observed to be immobilized within the dietary fiber matrix. Thus, interfacial membranes comprising at least one substantially indigestible food-grade component, such as an indigestible polysaccharide component, are not only useful in protecting the hydrophobic component, particularly lipid components, from digestion, but are useful in improving the stability of emulsions to environmental stresses, such as freezing and heating.

In part, the present invention also relates to a method of utilizing encapsulated or emulsified lipid compositions to control digestion and/or uptake of fat and calories, such a method comprising (1) providing an emulsion system containing at least one fat/oil component encapsulated by at least one indigestible food-grade component and (2) incorporating the emulsion system into one of a food and a beverage product.

As described herein, the emulsion system can be prepared by contacting one or more indigestible, surface-active dietary fiber components with the fat/oil component, or alternatively, by contacting one or more emulsifier and/or polymeric components, at least one of which also includes an indigestible, dietary fiber component and/or indigestible food-grade material. The emulsions are stabilized under appropriate environmental conditions, whereby the lipid, fiber, emulsifier and/or polymeric components are selected based on the temperature, pH, salt concentration, and ionic strength appropriate for the processing and end-use application of the food and/or beverage product. Moreover, there exists a wide range of component choice for each interfacial membrane encapsulating the lipid component thereby permitting selection of materials that do not alter the physicochemical and sensory properties of the encapsulated lipids and permitting such encapsulated lipids to be readily substituted into food or beverage products without impacting the taste, appearance, texture and stability of the products.

Because at least one of the interfacial membranes of the encapsulated lipid component is an indigestible food-grade material, the lipid component, once incorporated into a food or beverage product will not be available for digestion (or degradation by digestive enzymes and subsequent absorption by the digestive system). Accordingly, food or beverage products incorporating such encapsulated lipids in place of conventional, digestible lipid components would have significantly reduced digestible fat and caloric content together with an increased level of dietary fiber.

Such food or beverage products suitable for substitution with encapsulated lipid components can include any emulsion-based foodstuff described herein or as would otherwise be known to those skilled in the art including, but not limited to, mayonnaise, spreads, beverages, puddings, soups, coffee whiteners, and desserts (ice creams, etc). However, the method can also be used for reducing the caloric content of other types of fat containing food products, such as meat products, bakery products, cakes, cookies, chips and crackers.

Examples of the Invention

The following non-limiting examples and data illustrate various aspects and features relating to the compositions, complexes and methods of the present invention, including the synthesis of encapsulated lipid complexes and stabilized emulsified lipid systems and use thereof in the synthesis of food products, such compositions as are available through the methodologies described herein. In comparison with the prior art, the present compositions and methods provide results and data which are surprising, unexpected and contrary thereto. It should, of course, be understood that these examples are included for illustrative purpose only and that the invention is not limited to the particular combinations of lipids, dietary fibers or polyelectrolyte materials, conditions, properties or the like set forth herein. Comparable utility and advantages can be realized using various other methodologies and/or compositional embodiments consistent with the scope of this invention.

GENERAL METHODS

Powdered chitosan (Medium molecular weight; Deacetylation, 81%; Viscosity of 1-wt % solution in 1-wt % acetic acid, 286 Cps; Moisture 4.6 wt %; Ash, 0.5 wt %) was obtained from Aldrich Chemical Company (St. Louis, Mo.). Powdered lecithin (Ultralec P; Acetone Insolubles, 97.5%; Acid Value, 27.9 mg per g; Peroxide value, 0.9 mEq per kg; Moisture, 0.77 wt %) was obtained from ADM-Lecithin (Decatur, Ill.). Powdered pectin (TIC PRETESTED, Prehydrated pectin, High Methoxyl, rapid set powder) was obtained from TIC GUMS (Belcamp, Md.). Analytical grade sodium chloride, hydrochloric acid, sodium hydroxide, and acetic acid were purchased from the Sigma Chemical Company (St. Louis, Mo.). Distilled and de-ionized water was used for the preparation of all solutions.

Solution Preparation. A stock buffer solution was prepared by dispersing 100 mM acetic acid in water and then adjusting the pH to 3.0 using 1 M HCl. A chitosan solution was prepared by dispersing 0.2 wt % powdered chitosan into stock buffer solution. A pectin solution was prepared by dispersing 0.4 wt % powdered pectin into stock buffer solution. An emulsifier solution was prepared by dispersing 1.0 wt % lecithin powder into buffer solution. The emulsifier solution was sonicated for 30 seconds at a frequency of 20 kHz, amplitude of 40% and duty cycle of 0.5 s (Model 500, Sonic Disembrator, Fisher Scientific, Pittsburgh, Pa.) to disperse the lecithin. The pH of the solution was adjusted back to 3.0 using HCl, and then the solution was stirred for about 1 hour to ensure complete dissolution of the lecithin.

Characterization of Emulsions

Particle size measurements. Emulsions were diluted to a droplet concentration of approximately 0.005 wt % using buffer solution to avoid multiple scattering effects. The particle size distribution of the emulsions was measured using a laser light scattering instrument (Horiba LA-900, Irvine, Calif.). This instrument measures the angular dependence of the intensity of laser light ($\lambda$=632.8 nm) scattered by a dilute emulsion, and then finds the particle size distribution that gives the best agreement between theoretical predictions and experimental measurements. A refractive index ratio of 1.08 was used in the calculations of the particle size distribution. It should be noted that the theory used to calculate the particle size distribution assumes that the particles are spherical and homogeneous, and therefore the data obtained on emulsions that contained flocs should be treated with caution because they are non-spherical and non-homogenous. Mean particle diameters were calculated as the average of measurements made on at least two samples, with standard deviations being less than 10%.

$\zeta$-Potential measurements. Emulsions were diluted to a droplet concentration of approximately 0.005 wt % using buffer solution to avoid multiple scattering effects. Diluted emulsions were injected directly into the measurement chamber of a particle electrophoresis instrument (ZEM5003, Zetamaster, Malvern Instruments, Worcs., UK). The $\zeta$-potential was then determined by measuring the direction and velocity of droplet movement in a well-defined electric field. The $\zeta$-potential measurements are reported as the mean and standard deviation of two separate injections, with five readings made per injection.

Creaming stability measurements. Approximately 3.5 g samples of diluted emulsion (0.005 wt % oil) were transferred into 1-cm pathlength plastic spectrophotometer cuvettes, and then stored at 30° C. for 7 days. The turbidity (at 600 nm) of the emulsions was then measured using an UV-visible spectrophotometer (Spectronic 21D, Milton Roy, Rochester, N.Y.). The light beam passed through the emulsions at a height that was about 10 mm from the cuvette bottom, i.e., about 30% of the emulsion's height. The oil droplets in the emulsions moved upwards due to gravity, which led to the formation of a relatively clear droplet-depleted serum layer at the bottom of the cuvette. An appreciable decrease in emulsion turbidity was therefore an indication of the fact that the serum layer had risen to at least 30% of the emulsion's height.

Example 1

Emulsion preparation. A primary emulsion was prepared by homogenizing 5 wt % corn oil with 95 wt % aqueous emulsifier solution in a high-speed blender (M133/1281-0, Biospec Products, Inc., ESGC, Switzerland) followed by two passes at 4,000 psi through a two-stage high-pressure valve homogenizer (LAB 1000, APV-Gaulin, Wilmington, Mass.). A secondary emulsion was prepared by mixing the primary emulsion with appropriate amounts of chitosan solution and buffer solution to obtain a final concentration of 1 wt % corn oil, 0.2 wt % lecithin, 0.0155 wt % chitosan, 100 mM acetic acid (pH 3.0). These systems were stirred for 1 hour using a magnetic stirrer at ambient temperature. The flocs formed in this emulsion were disrupted by passing it twice through a high pressure value homogenizer at a pressure of 4000 psi, as described previously (8, 9). Tertiary emulsions were formed by diluting the secondary emulsion with aqueous pectin solutions to produce a series of emulsions with different pectin concentrations: 0.5 wt % corn oil, 0.1 wt % lecithin, 0.0078 wt % chitosan, 100 mM acetic acid and 0 to 0.02 wt % pectin (pH 3.0). These systems were stirred for 1 hour using a magnetic stirrer at ambient temperature. The tertiary emulsions were stored at room temperature for 24 hours before being analyzed.

Example 2a

Figure 2:
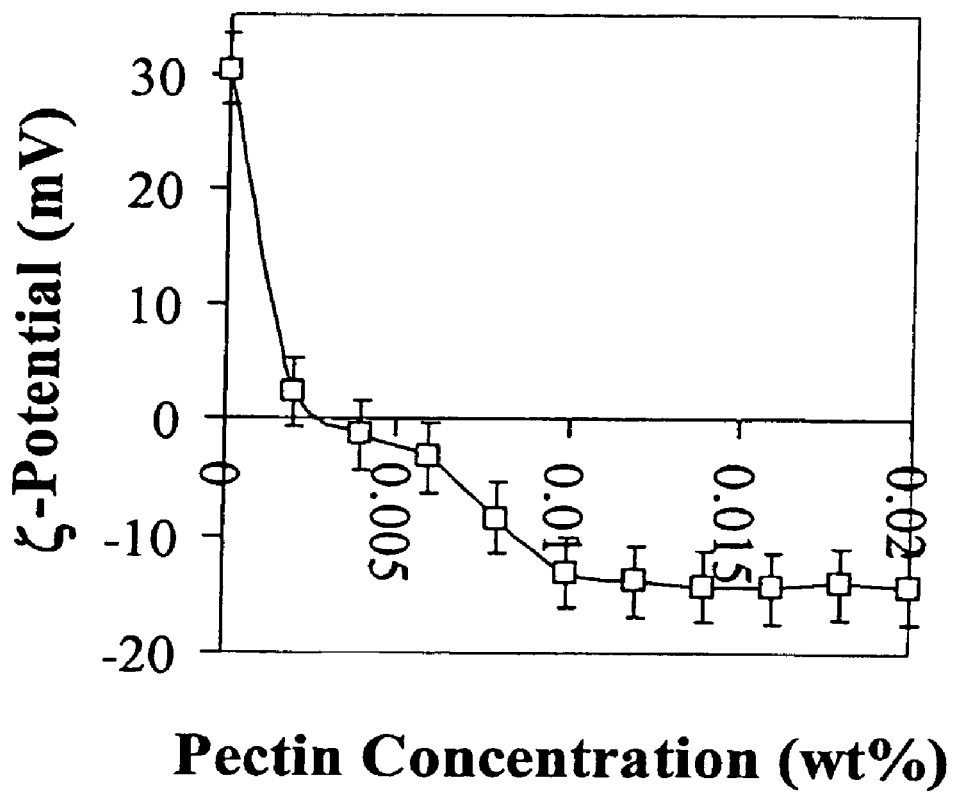
FIG. 2. Dependence of particle electrical charge ($\zeta$-potential) on pectin concentration for tertiary emulsions (0.5 wt % corn oil, 0.1 wt % lecithin, 0.0078 wt % chitosan, 100 mM acetic acid, pH 3.0).

Influence of pectin concentration on droplet charge. The electrical charge and mean droplet diameter of tertiary emulsions (0.5 wt % corn oil, 0.1 wt % lecithin, 0.0078 wt % chitosan, 100 mM acetic acid, pH 3.0) containing different pectin concentrations (0 to 0.02 wt %) was measured. In the absence of chitosan, the electrical charge on the secondary emulsion droplets was +30 mV (FIG. 2), indicating that the lecithin-chitosan membrane had a relatively high positive charge at pH 3. The electrical charge on the droplets became increasingly less positive, and eventually changed from positive to negative as the pectin concentration in the emulsions was increased (FIG. 2). There was no net charge on the droplets when the pectin concentration was around 0.003 wt %, indicating that sufficient pectin had adsorbed to neutralize the charge on the original droplets. The negative charge on the droplets reached a constant value of −14 mV when the pectin concentration exceeded about 0.01 wt %.

Example 2b

Figure 3:
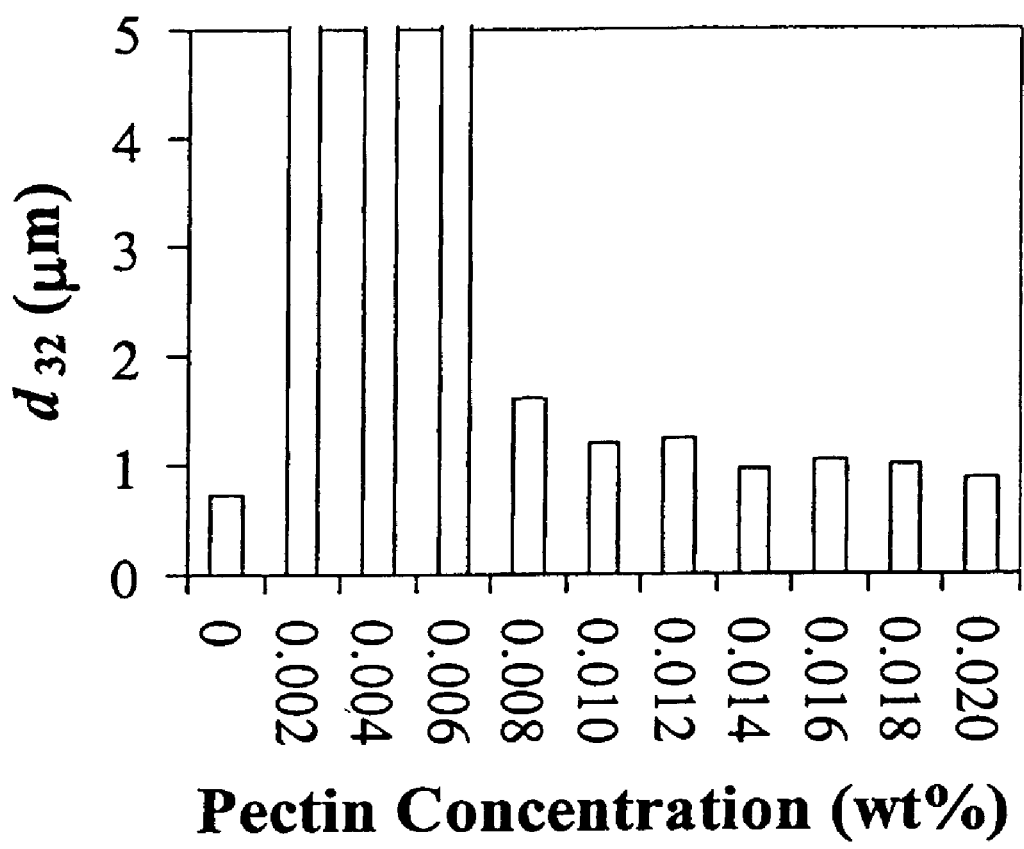
FIG. 3. Dependence of mean particle diameter ($d_{32}$) on pectin concentration for tertiary emulsions (0.5 wt % corn oil, 0.1 wt % lecithin, 0.0078 wt % chitosan, 100 mM acetic acid, pH 3.0).

Influence of pectin concentration on particle size. The mean particle diameter of tertiary emulsions was measured 24 hours after pectin was mixed with the secondary emulsions (FIG. 3). The emulsion was stable to droplet aggregation in the absence of pectin. At pectin concentrations from 0.002 to 0.006 wt % extensive droplet aggregation was observed in the emulsions. Droplet aggregation was so extensive that we were unable to make reliable particle sizing measurements using the laser diffraction technique, either because the aggregates were too large or because their concentration was too small to give a scattering pattern that was sufficiently different from that of the background. Individual particles within these samples could be distinctly observed by eye, which suggested that they were at least 100 μm in diameter.

The origin of the extensive droplet flocculation in these emulsions is believed to be two-fold. First, the magnitude of the net electrical charge on the droplets is relatively small (<5 mV), therefore the electrostatic repulsion between the droplets would not be sufficient to prevent aggregation. Second, it is possible that pectin molecules adsorbed to the surface of more than one emulsion droplet during the formation of the third layer emulsions, thus acting as polymeric bridges that held the droplets together. At pectin concentrations from ≧0.008 to 0.02 wt % the particle diameter ($d_{32}$~1.6 to 0.9 μm) was significantly higher than that observed in the absence of chitosan ($d_{32}$~0.7 μm), indicating that there was a limited degree of droplet aggregation. Nevertheless, it was much less than that observed from 0.002 to 0.006 wt % pectin. A previous study has shown that flocs in multilayered emulsions can be disrupted by application of mechanical agitation. In this study, it was found that passing tertiary emulsions containing 0.02 wt % pectin twice through a high pressure valve homogenizer at 4000 psi reduced the mean particle diameter ($d_{32}$~0.7 μm) close to that found in the absence of pectin, suggesting that the flocs could be disrupted by application of mechanical agitation.

Example 3a

Figure 5A:
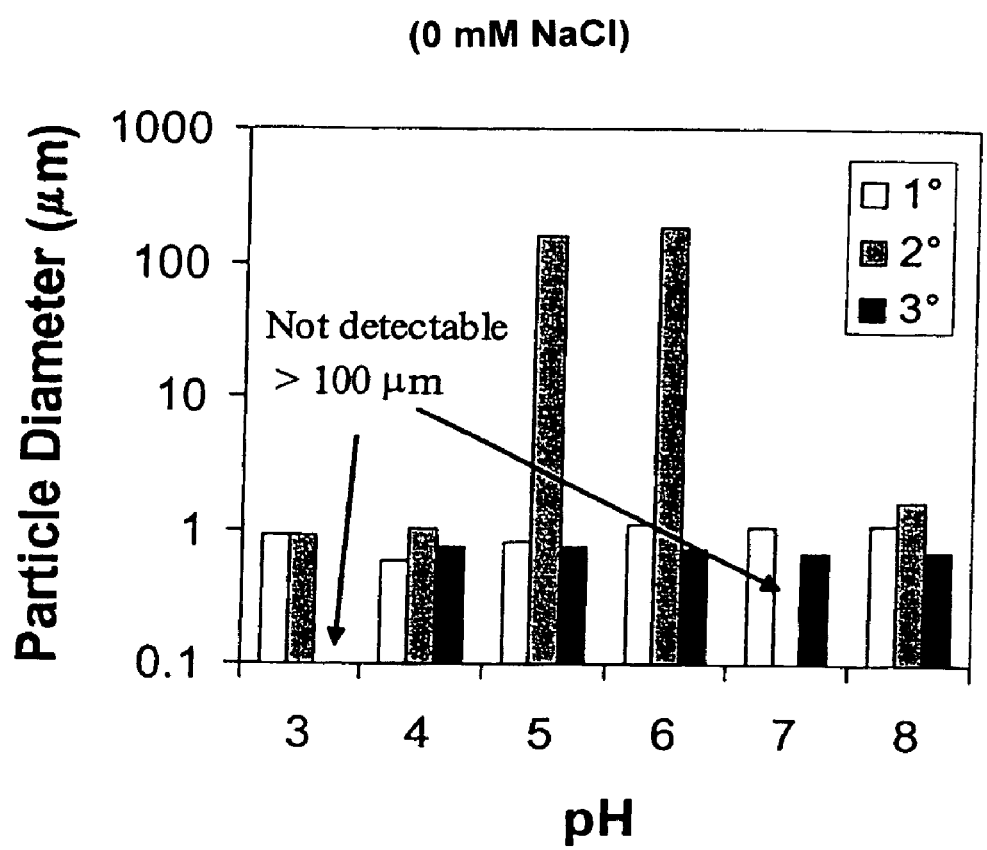
FIG. 5. Dependence of mean particle diameter ($d_{32}$) on pH for tertiary emulsions (0.5 wt % corn oil, 0.1 wt % lecithin, 0.0078 wt % chitosan, 0.002 wt % pectin, 100 mM acetic acid, pH 3.0); (a) 0 mM NaCl; (b) 100 mM NaCl.
Figure 5B:
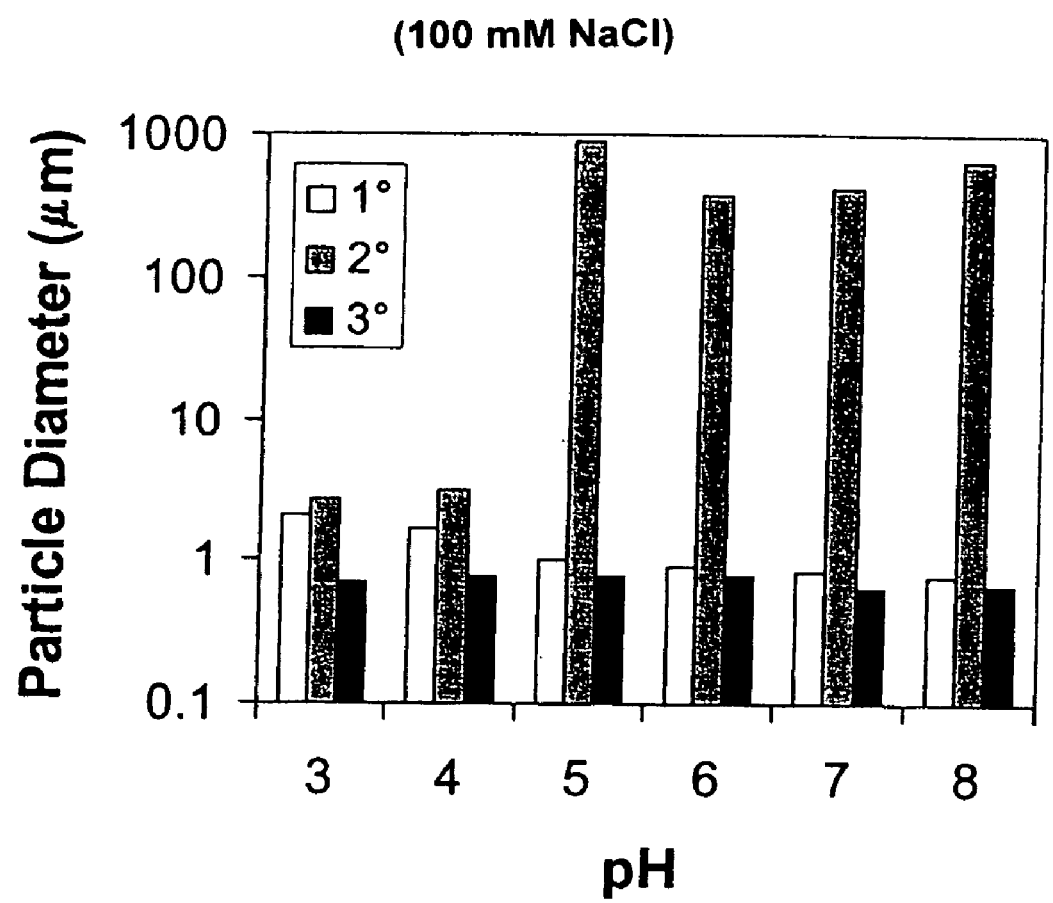
Figure 6A:
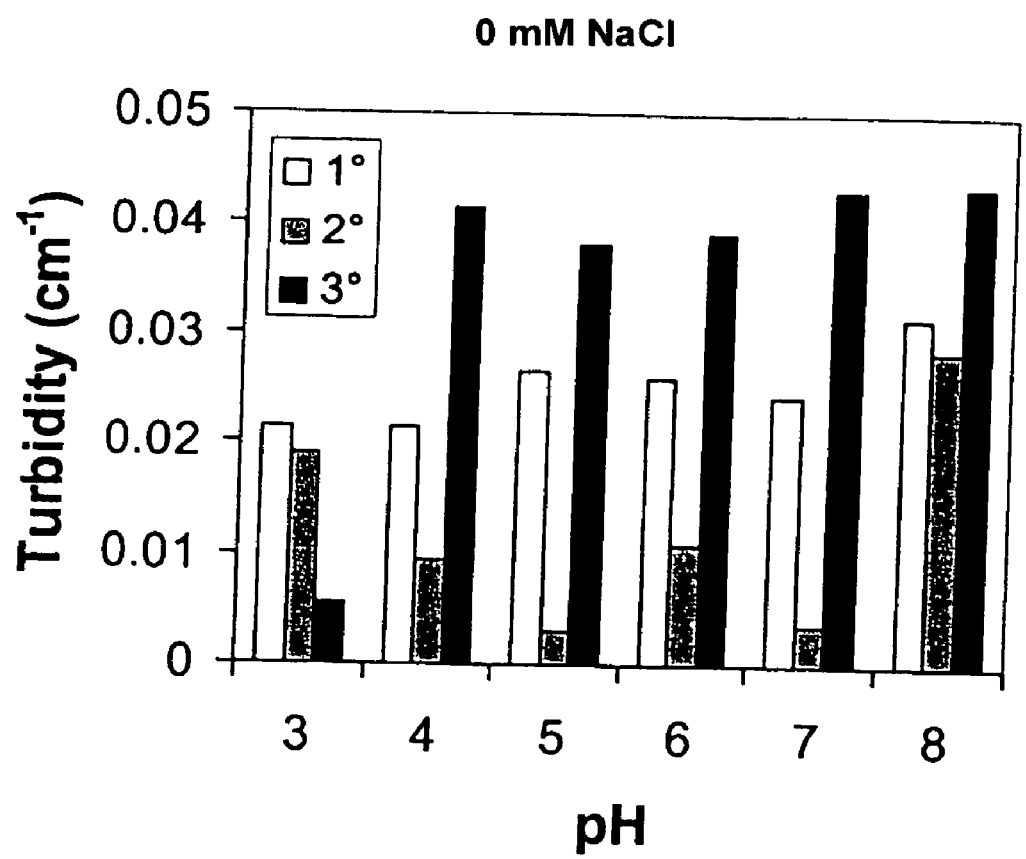
FIG. 6. Dependence of emulsion creaming stability on pH for tertiary emulsions (0.5 wt % corn oil, 0.1 wt % lecithin, 0.0078 wt % chitosan, 0.002 wt % pectin, 100 mM acetic acid, pH 3.0); (a) 0 mM NaCl; (b) 100 mM NaCl. The creaming stability was determined as turbidity (at 600 nm) measured at 30% of emulsion height after 7 days storage: creaming instability is indicated by a low turbidity. Initial emulsion turbidities were around 0.4 to 0.45 $cm^{-1}$.
Figure 6B:
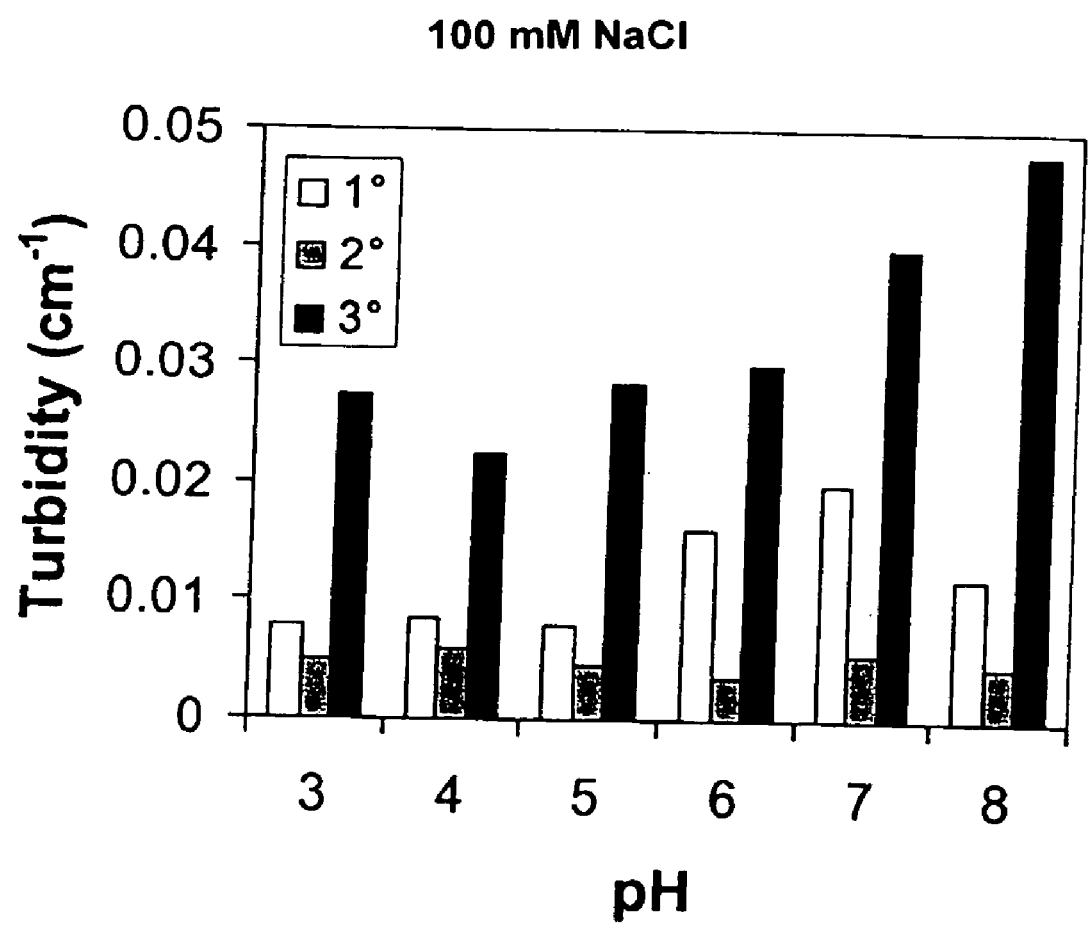

A tertiary emulsion was prepared with a composition of 0.5 wt % corn oil, 0.1 wt % lecithin, 0.0078 wt % chitosan, 0.02 wt % pectin, and 100 mM acetic acid (pH 3.0). Prior to utilization, any flocs formed in this emulsion were disrupted by passing it twice through a high pressure value homogenizer at 4000 psi. A series of dilute emulsions (~0.005 wt % corn oil) with different pH (3 to 8) and ionic strength (0 or 100 mM NaCl) were formed by diluting primary, secondary and tertiary emulsions with distilled water or NaCl solutions and then adjusting the pH with HCl or NaOH. These emulsions could be analyzed directly by laser diffraction, particle electrophoresis and turbidity techniques without the need of further dilution. The diluted primary, secondary and tertiary emulsions were then stored for 1 week at room temperature and their electrical charge, mean droplet diameter and creaming stability were measured (FIGS. 4-6).

Example 3b

Figure 4A:
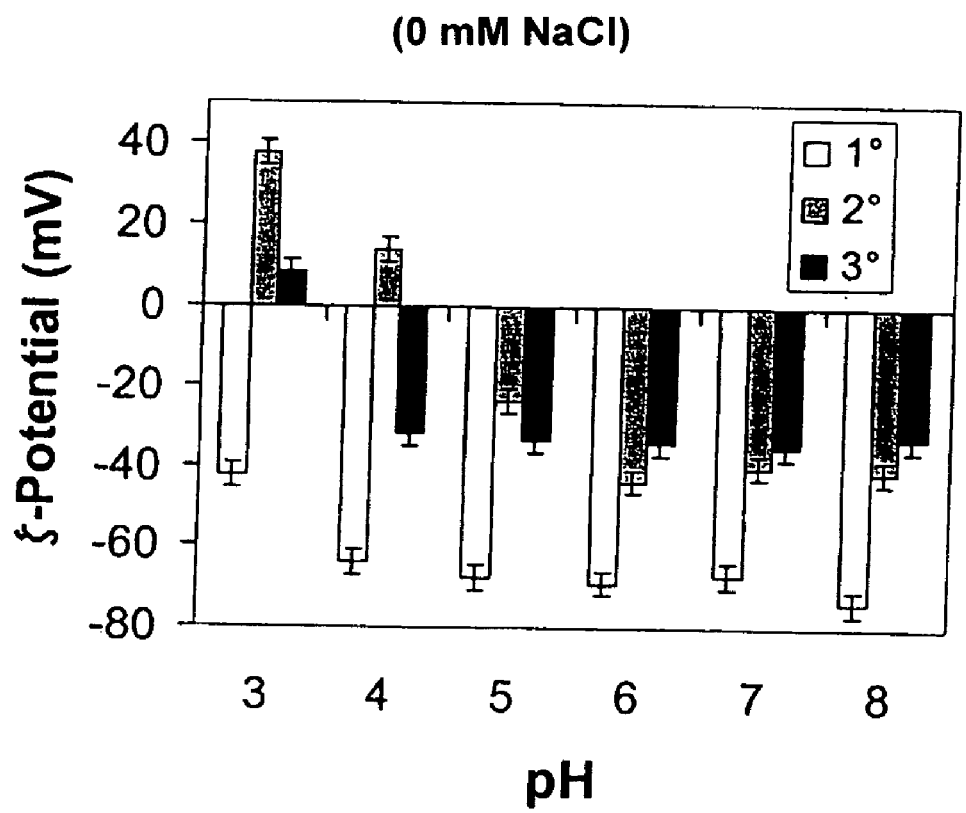
FIG. 4. Dependence of particle electrical charge ($\zeta$-potential) on pH for tertiary emulsions (0.5 wt % corn oil, 0.1 wt % lecithin, 0.0078 wt % chitosan, 0.002 wt % pectin, 100 mM acetic acid, pH 3.0); (a) 0 mM NaCl; (b) 100 mM NaCl.
Figure 4B:
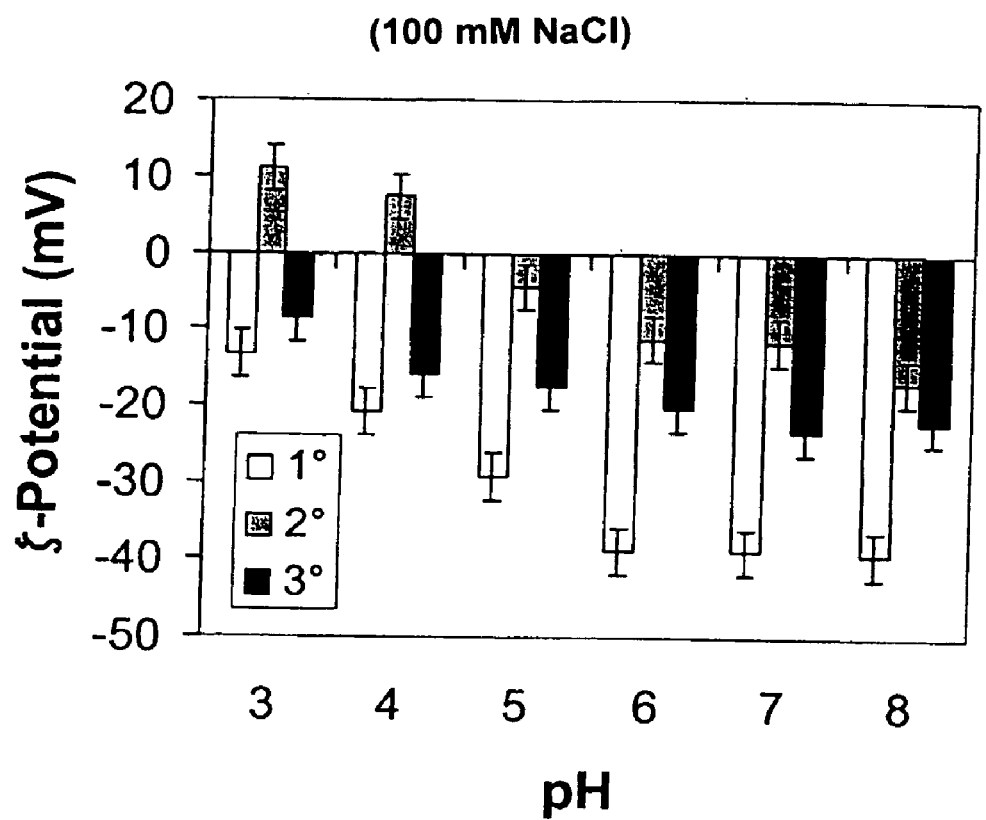

Affect on Droplet Charge—Primary Emulsions. The ζ-potential of the droplets in the primary emulsions was negative at all pH values, but was appreciably more negative at high than at low pH (FIG. 4). The droplet charge was probably less negative at low pH because a smaller fraction of the adsorbed lecithin molecules were ionized, since the $pK_a$ value of the anionic phosphate groups on lecithin is around pH 1.5. The magnitude of the electrical charge on the droplets in the primary emulsions decreased upon the addition of salt, e.g., the ζ-potential changed from −42 to −13 mV at pH 3 when the NaCl was increased from 0 to 100 mM (FIGS. 4a and 4b).

This reduction can be attributed to electrostatic screening effects, which cause a reduction in the surface charge potential of colloidal particles with increasing ionic strength.

Example 3c

Affect on Droplet Charge—Secondary Emulsions. The ζ-potential of the secondary emulsions was highly positive (~38 mV) at pH 3 due to adsorption of cationic chitosan molecules onto the surface of the anionic lecithin-coated droplets. As the pH was increased the electrical charge on the droplets became less positive (pH 4), and eventually it became negative (pH≧5). The reduction in the positive charge on the droplets with increasing pH is probably the result of deprotonation of the $-NH_3^+$ groups on the chitosan. These groups have a pK value around 6.3 to 7, hence as the pH is increased the chitosan becomes less positively charged. As the chitosan loses its positive charge, the electrostatic attraction between the anionic lecithin molecules and the cationic chitosan molecules decreases. Consequently, it is possible that the chitosan molecules may have desorbed from the droplet surfaces at higher pH, although this is not necessary to explain the observed effects. It is interesting to note that the negative charge on the droplets in the secondary emulsion was significantly lower than that on the droplets in the primary emulsion at high pH (pH 6 to 8). A possible explanation of this phenomenon is that there is some chitosan adsorbed to the droplet surfaces that still has a residual positive charge. Alternatively, the presence of adsorbed chitosan at the droplet surface may increase the thickness of the Stern layer, which would reduce the measured ζ-potential. The magnitude of the ζ-potential in the secondary emulsions decreased as the NaCl concentration was increased from 0 to 100 mM, presumably due to the electrostatic screening effects mentioned earlier.

Example 3d

Affect on Droplet Charge—Tertiary Emulsions. At pH 3, the ζ-potential in the tertiary emulsions was slightly positive (+8 mV) in the absence of salt, which suggests that the negative charge on the adsorbed pectin molecules was insufficient to overcome the high positive charge on the lecithin-chitosan coated droplets (+38 mV). The $pK_a$ value of the carboxylic groups on pectin is usually around pH 4 to 5, hence pectin has a smaller negative charge at low pH than at high pH. Consequently, its effectiveness at decreasing the positive charge on the lecithin-chitosan coated droplets would have been reduced at this low pH. Interestingly, when 100 mM NaCl was present at pH 3, the charge on the tertiary emulsions was negative (−9 mV), which suggests that the negative charge on the adsorbed pectin was sufficient to overcome the much reduced positive charge (+11 mV) on the lecithin-chitosan coated droplets in the presence of salt. At pH≧4, the tertiary emulsions were anionic in the presence and absence of salt, which suggested that the negative charge on the adsorbed pectin molecules was more than sufficient to balance the positive charge on the lecithin-chitosan coated droplets. At high pH values (pH 6 to 8), the ζ-potential of the tertiary emulsions was less negative than in the primary emulsions in the presence and absence of salt. However, the ζ-potential of the tertiary emulsions was less negative than that of the secondary emulsions in the absence of salt, but more negative in the presence of salt. The precise reason for these differences is currently unclear, but is probably associated with changes in the composition and structure of the interfacial membranes in the primary, secondary and tertiary emulsions with pH and ionic strength. The magnitude of the ζ-potential decreased when the salt concentration was increased from 0 to 100 mM NaCl, presumably due to electrostatic screening effects.

Example 4a

Affect on Droplet Aggregation—Primary Emulsions. The droplets in the primary emulsions were relatively stable to extensive droplet aggregation at all pH and NaCl values (FIG. 5). Nevertheless, the particles in the emulsions stored at low pH values (pH 3 and 4) in the presence of salt (FIG. 5b) were significantly larger than those in the emulsions stored in the absence of salt (FIG. 5a). For example, at pH 3, $d_{32}$=2.1+0.2 µm at 100 mM NaCl and 0.91±0.09 µm at 0 mM NaCl. Droplet aggregation at low pH and high salt may have been because the reduced charge on the lecithin molecules combined with the increased electrostatic screening caused a reduction in the electrostatic repulsion between the droplets. In addition, salt reduces the curvature of phospholipid membranes by reducing the effective head group size of the polar lipids, which favors droplet coalescence in emulsions.

Example 4b

Affect on Droplet Aggregation—Secondary Emulsions. In the absence of added NaCl, the droplets in the secondary emulsions were relatively stable to droplet aggregation at low (pH 3 and 4) and high (pH 8) pH values, but were highly unstable at intermediate pH values (FIG. 5a). The droplets were probably stable to droplet aggregation at pH 3 because the high positive charge on the droplets led to strong electrostatic repulsion between the droplets. As the pH was increased the chitosan molecules began to lose their positive charge ($pK_a$~6.3 to 7), and hence the charge on the droplets decreased. In addition, the chitosan molecules would be less strongly held to the surface of the lecithin coated droplets because the electrostatic attraction between cationic chitosan and the anionic lecithin molecules would be reduced. Consequently, some of the chitosan molecules may have been completely or partly displaced from the surface of the emulsion droplets. These chitosan molecules could then act as polymeric bridges that held the negatively charged lecithin coated droplets together. Bridging flocculation may therefore have been responsible for the high degree of droplet aggregation observed at intermediate (pH 5 to 7) pH values. The emulsion may have become more stable to droplet aggregation at pH 8 because the chitosan molecules had lost most of the positive charge, and were therefore not as effective at inducing bridging flocculation. In the presence of 100 mM NaCl, the emulsions were still relatively stable to flocculation at low pH values (pH 3 and 4), but were unstable at all higher values. Aggregation may have occurred in the pH 8 emulsion when salt was added because the electrostatic repulsion between the droplets was sufficiently screened.

Example 4c

Affect on Droplet Aggregation—Tertiary Emulsions. The droplets in the tertiary emulsions were stable to droplet aggregation at all pH values in the absence and presence of salt, with the exception of the pH 3 emulsion at 0 mM NaCl (FIG. 5a). Aggregation probably occurred in this emulsion because the droplets had a small ζ-potential (FIG. 4a) so that the electrostatic repulsion between them was relatively weak. In addition, there may have been bridging flocculation between the negatively charged pectin molecules in the aqueous phase and the positively charged droplets. These results indicate that emulsions with good stability against droplet aggregation can be produced using lecithin-chitosan-pectin membranes.

Example 5

Affect on Creaming Stability. The creaming stability of the diluted emulsions was determined by measuring the turbidity at 30% of their height after 1 week storage (FIG. 6). If extensive droplet aggregation occurred, then it would be expected that the turbidity would be reduced because flocs cream more rapidly than individual droplets. All emulsions were more stable to creaming in the absence of salt than in its presence. This can primarily be attributed to the greater screening of electrostatic repulsive interactions between electrically charged droplets at higher salt concentrations. The primary emulsions were relatively stable to creaming at all pH values in the absence of salt, but exhibited some creaming at low pH (pH 3-5) in the presence of salt. The secondary emulsions were highly susceptible to creaming at intermediate pH values (pH 4-7) in the absence of salt, and at all pH values in the presence of salt. The droplets in the tertiary emulsions were relatively stable to creaming at all pH in the absence and presence of salt, with the exception of the pH 3 emulsion at 0 mM NaCl. The creaming stability measurements therefore largely supported the particle size measurements made using laser diffraction (FIG. 5).

Emulsions with relatively small particles, tended to be more stable to creaming. The tertiary emulsions may have been stable to droplet aggregation because of the relatively strong electrostatic and steric repulsion associated with the relatively thick and electrically charged three-layer interfacial membrane. In addition, the creaming stability may have been improved because the multiple layers increased the overall density of the droplets, thereby reducing the density contrast between the dispersed and continuous phases and decreasing the driving force for gravitational separation.

Example 6A

Materials. Corn oil (Mazola), Lauryl sulfate, sodium salt 99% (Sigma L4509, Sigma Chemical Company (St. Louis, Mo.)), Chitosan, from crab shell, min. 85% deacetylated (Sigma C3646), Pectin from citrus fruits, grade 1 (Sigma P9135), 100 mM acetic acid (Fisher A38-212) buffer, pH 3, 100 mM sodium acetate (Fisher S210-500) buffer, pH 7.5, 0.9M sodium bicarbonate (Fisher S6313) solution, 1N sodium hydroxide (Sigma S5881) solution, Bile extract (Sigma B8631) solution (12 mg/ml of bile extract in 100 mM/L sodium bicarbonate).

General Methods. The particle size distribution of the emulsions was measured using a laser light scattering instrument (Mastersizer, Malvern Instruments Ltd., Worcs., UK). The ζ-potential was then determined by measuring the direction and velocity of droplet movement in a well-defined electric field using a particle electrophoresis instrument (ZEM5003, Zetamaster, Malvern Instruments, Worcs., UK).

Emulsion Preparation and Characterization. A corn oil-in-water emulsion was prepared that was stabilized by SDS-chitosan-pectin membranes (5 mM/kg SDS, 0.225% chitosan, 0.5% pectin, 100 mM acetate buffer, pH3). Chitosan and pectin are considered to be dietary fibers, and therefore the interfacial membrane surrounding the oil droplets in these emulsions consisted of dietary fiber. The emulsion was prepared using a multistage procedure. First, primary emulsions containing anionic droplets (ζ≈−75 mV, $d_{32}$=0.44 µm) stabilized by SDS membranes were prepared using a sonicator. Second, secondary emulsions containing cationic droplets (ζ≈+66 mV) stabilized by SDS-chitosan membranes were formed by diluting the primary emulsion with aqueous chitosan solution and sonicating to disrupt any flocs. Third, tertiary emulsions containing anionic droplets (ζ≈−10 mV) stabilized by SDS-chitosan-pectin membranes were formed by diluting the secondary emulsion with aqueous pectin solution.

Example 6B

In vitro Digestion ModeL The emulsions were subjected to the following in vitro digestion model. First, 9 g of emulsion was placed in a 50 ml screw capped bottle. About 0.25 ml 1N HCL was added and the pH was adjusted to about 2 using 1N HCL. The emulsion was incubated at approximately 37 C for about 1 hour, mixing at 95 rpm. The pH was adjusted to about 5.3 with 0.9 M sodium bicarbonate. 2.25 ml bile extract solution was added to the emulsion (12 mg/ml bile extract in 100 mM sodium bicarbonate). The pH was then adjusted to about 7.5 with 1N sodium hydroxide. The emulsion was incubated at about 37 C for approximately 2 hours, mixing at 95 rpm. After work-up, particle size and zeta potential were measured. The results are presented in Table 1.

TABLE 1

| Digestion step | Zeta Potential | Particle size (d32) |
|---|---|---|
| pH 2 | −19.5 | 0.30 |
| pH 5.3 | −19.5 | 1.18 |
| pH 7.5 | n/a* | n/a* |

*Could not measure pH 7.5 because the emulsion separated into flocs that could not be broken down with agitation.

The results show that the droplets stabilized by SDS-chitosan-pectin remained intact (similar ζ-potentials and low mean droplet sizes) in the digestion model even after the bile was added to the system (pH 5.3). Extensive aggregation was observed by optical microscopy when the pH was adjusted to pH 7.5 and the fat droplets were seen to be trapped in a dietary fiber matrix. Previous studies have shown that droplets surrounded by chitosan are not susceptible to lipid hydrolysis by lipase/co-lipase in the pancreas. These results therefore suggest that oil droplets stabilized by interfacial membranes comprising at least one indigestible polysaccharide remain intact during digestion will prevent lipid absorption in the human body.

We claim:

1. An emulsion system for delivery of a food-grade hydrophobic component, the system comprising:
   a dispersion comprising a substantially hydrophobic component in an aqueous medium;
   a first polysaccharide layer component having a net charge incorporated into the dispersion and adsorbed on said hydrophobic component; and
   a second polysaccharide layer component incorporated into the system after incorporation of said first polysaccharide layer component and interfacially adsorbed on said first polysaccharide layer component, said second polysaccharide layer component having a net charge opposite said first polysaccharide component net charge, wherein at least one of said first and second polysaccharide layer components is substantially indigestible.

2. The emulsion system of claim 1, wherein the hydrophobic component is a fat or an oil component selected from the group consisting of corn oil, soybean oil, sunflower oil, canola oil, rapeseed oil, olive oil, peanut oil, algal oil, nut oils, plant oils, vegetable oils, fish oils, flavor oils, animal fats, dairy fats and combinations thereof.

3. The emulsion system of claim 1, wherein at least one of said first and second polysaccharide layer components is a dietary fiber.

4. A multi-layer emulsion composition for controlling digestion of a fat or an oil ingredient, the composition comprising:
   a substantially hydrophobic component in an aqueous medium;
   an emulsifier layer component having a net charge adsorbed on said hydrophobic component; and
   a first polymeric layer component interfacially adsorbed on said emulsifier layer component, wherein at least a portion of the polymeric component has a net charge opposite that of the net charge of the emulsifier component, wherein at least one of the emulsifier component and the polymeric component comprises a substantially indigestible polysaccharide component,
   said first polymeric component layer adsorbed on said emulsifier layer component subsequent to said emulsifier layer component adsorption on said hydrophobic component.

5. The composition of claim 4, wherein the hydrophobic component is a fat or an oil component selected from the group consisting of corn oil, soybean oil, sunflower oil, canola oil, rapeseed oil, olive oil, peanut oil, algal oil, nut oils, plant oils, vegetable oils, fish oils, flavor oils, animal fats, vegetable fats and combinations thereof.

6. The composition of claim 4, wherein the hydrophobic component is one or more natural or synthetic lipid components.

7. The composition of claim 4, wherein the emulsifier component is selected from the group consisting of lecithin, chitosan, pectin, locust bean gum, gum arabic, guar gum, alginic acids, alginates, cellulose, modified cellulose, modified starch, whey proteins, caseins, soy proteins, fish proteins, meat proteins, plant proteins, polysorbates, fatty acid salts, DATEM, CITREM, small molecule surfactants and combinations thereof.

8. The composition of claim 4, wherein the polymeric component comprises one or more protein components, polysaccharide components and combinations thereof.

9. The composition of claim 4, wherein the indigestible polysaccharide component comprises at least one of chitosan, cellulose and derivatives thereof, methyl cellulose, inulin and derivatives thereof, lignin, aminopolysaccharides, pectin, carrageenan, alginate, food gums and combinations thereof.

10. The composition of claim 4, comprising a second polymeric layer component having a net charge, the second polymeric layer component in electrostatic interaction with at least a portion of the emulsifier layer component, at least a portion of the first polymeric layer component or both.

11. The composition of claim 4 wherein said emulsifier layer component is lecithin.

12. The composition of claim 4 wherein said first polymeric layer component is chitosan.

13. The composition of claim 4 comprising a second polymeric layer component interfacially adsorbed on said first polymeric layer component, wherein at least a portion of said second polymeric layer component has a net charge opposite the net charge of said first polymeric layer component.

14. The composition of claim 13 wherein said second polymeric layer component is a pectin.

15. A multi-layer emulsion composition for controlling digestion of a fat or an oil ingredient, the composition comprising:

a substantially hydrophobic component in an aqueous medium;

an emulsifier layer component having a net charge adsorbed on said hydrophobic component; and a chitosan component interfacially adsorbed on said emulsifier layer component, wherein at least a portion of the chitosan component has a net charge opposite that of the net charge of the emulsifier component.

16. The composition of claim 15, wherein the hydrophobic component is a fat or an oil component selected from the group consisting of corn oil, soybean oil, sunflower oil, canola oil, rapeseed oil, olive oil, peanut oil, algal oil, nut oils, plant oils, vegetable oils, fish oils, flavor oils, animal fats, vegetable fats and combinations thereof.

17. The composition of claim 15, wherein the hydrophobic component is one or more natural or synthetic lipid components.

18. The composition of claim 15, wherein the emulsifier component is selected from the group consisting of lecithin, pectin, locust bean gum, gum arabic, guar gum, alginic acids, alginates, cellulose, modified cellulose, modified starch, whey proteins, caseins, soy proteins, fish proteins, meat proteins, plant proteins, polysorbates, fatty acid salts, DATEM, CITREM, small molecule surfactants and combinations thereof.

19. The composition of claim 15 wherein said emulsifier layer component is lecithin.

20. The composition of claim 15 comprising a polymeric layer component interfacially adsorbed on said chitosan component, wherein at least a portion of said polymeric layer component has a net charge opposite the net charge of said chitosan component.

21. The composition of claim 20 wherein said polymeric layer component is a pectin.

* * * * *